United States Patent
Lee et al.

(10) Patent No.: US 11,350,309 B2
(45) Date of Patent: May 31, 2022

(54) METHOD AND APPARATUS FOR DEPRIORITIZING PACKET TRANSMISSION BASED ON RELIABILITY LEVEL OR CONGESTION LEVEL IN WIRELESS COMMUNICATION SYSTEM

(71) Applicant: LG Electronics Inc., Seoul (KR)

(72) Inventors: Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/770,439

(22) PCT Filed: Feb. 12, 2019

(86) PCT No.: PCT/KR2019/001663
§ 371 (c)(1),
(2) Date: Jun. 5, 2020

(87) PCT Pub. No.: WO2019/156528
PCT Pub. Date: Aug. 15, 2019

(65) Prior Publication Data
US 2021/0185559 A1    Jun. 17, 2021

Related U.S. Application Data

(60) Provisional application No. 62/629,141, filed on Feb. 12, 2018.

(51) Int. Cl.
*H04W 28/02* (2009.01)
*H04L 47/24* (2022.01)

(52) U.S. Cl.
CPC ..... *H04W 28/0289* (2013.01); *H04L 47/2458* (2013.01); *H04W 28/0247* (2013.01)

(58) Field of Classification Search
CPC ......... H04W 28/0289; H04W 28/0247; H04W 28/0284; H04L 47/2458
See application file for complete search history.

(56) References Cited

U.S. PATENT DOCUMENTS

2017/0214606 A1    7/2017  Park et al.
2019/0215685 A1*   7/2019  Wang ................ H04W 8/22
(Continued)

FOREIGN PATENT DOCUMENTS

WO    WO2017150956    9/2017

OTHER PUBLICATIONS

Ericsson, "Sidelink Carrier Selection Criteria for TX," R2-1713516, 3GPP TSG-RAN WG2 #100, Reno, Nevada, USA, dated Nov. 27-Dec. 1, 2017, 7 pages.
(Continued)

*Primary Examiner* — Omer S Mian
(74) *Attorney, Agent, or Firm* — Fish & Richardson P.C.

(57) ABSTRACT

A method and apparatus for determining a priority of a packet based on a reliability level and/or congestion level in a wireless communication system is provided. A user equipment (UE) receives information on a reliability level and/or a congestion level from a network, generates a first packet and a second packet, determines a priority of the first packet and/or a priority of the second packet when a condition related to the reliability level and/or the congestion level of the first packet and/or the second packet is met, and transmits at least one of the first packet and/or the second packet.

6 Claims, 6 Drawing Sheets

(56) References Cited

U.S. PATENT DOCUMENTS

2019/0239112 A1\* 8/2019 Rao .................. H04W 4/70
2021/0022170 A1\* 1/2021 Lu .................. H04W 28/0289

OTHER PUBLICATIONS

Ericsson, "Support of Reliable transmission over PC5 using extended PPPP," S2-180209, 3GPP TSG-SA WG2 Meeting #125, Gothenburg, Sweden, dated Jan. 22-26, 2018, 5 pages.
Intel Corporation, "Sidelink Carrier Aggregation for Mode-4 LTE V2V Communication," R1-1717330, 3GPP TSG RAN WG1 Meeting #90bis, Prague, Czech Republic, dated Oct. 9-13, 2017, 10 pages.

\* cited by examiner

[Fig. 1]
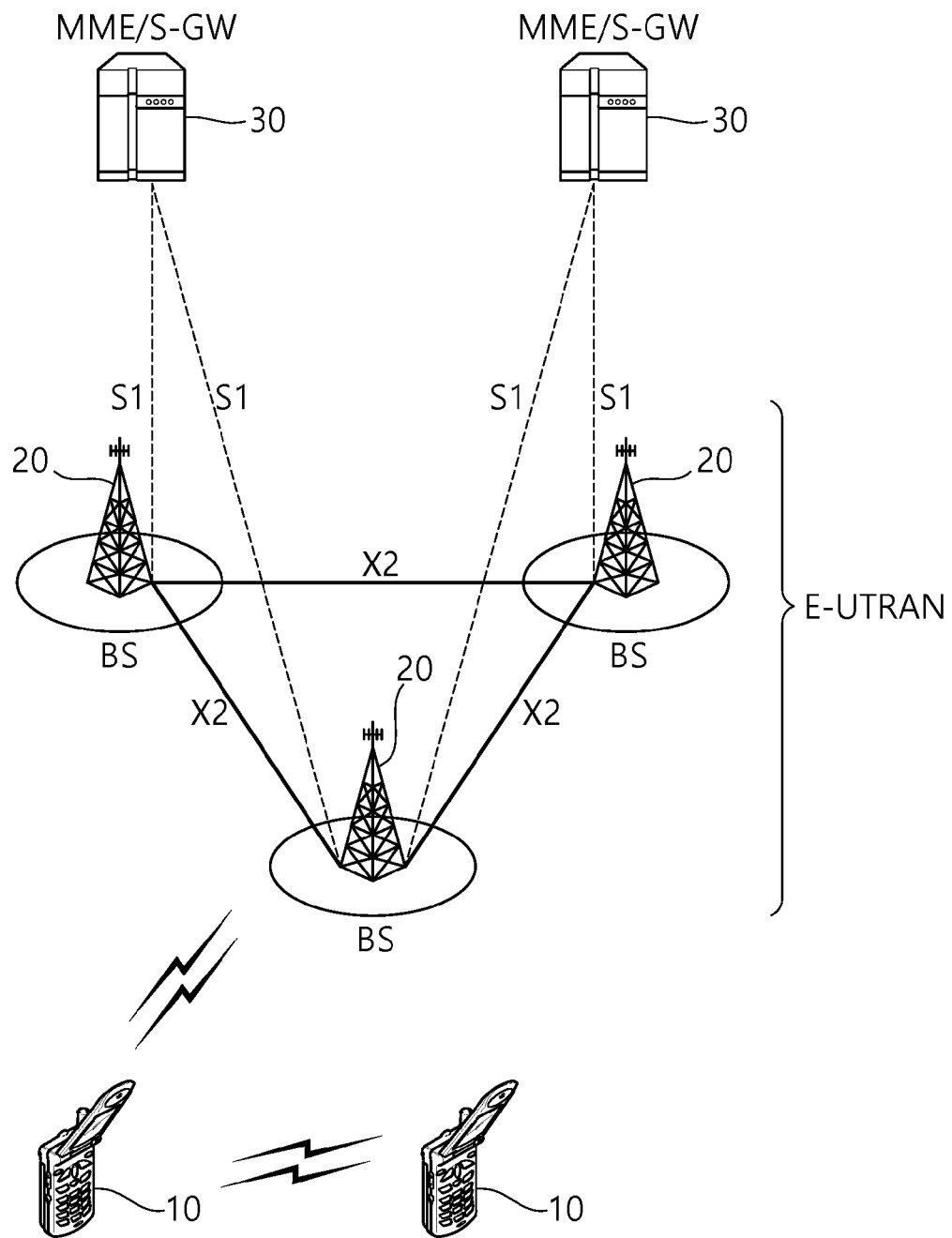

[Fig. 2]
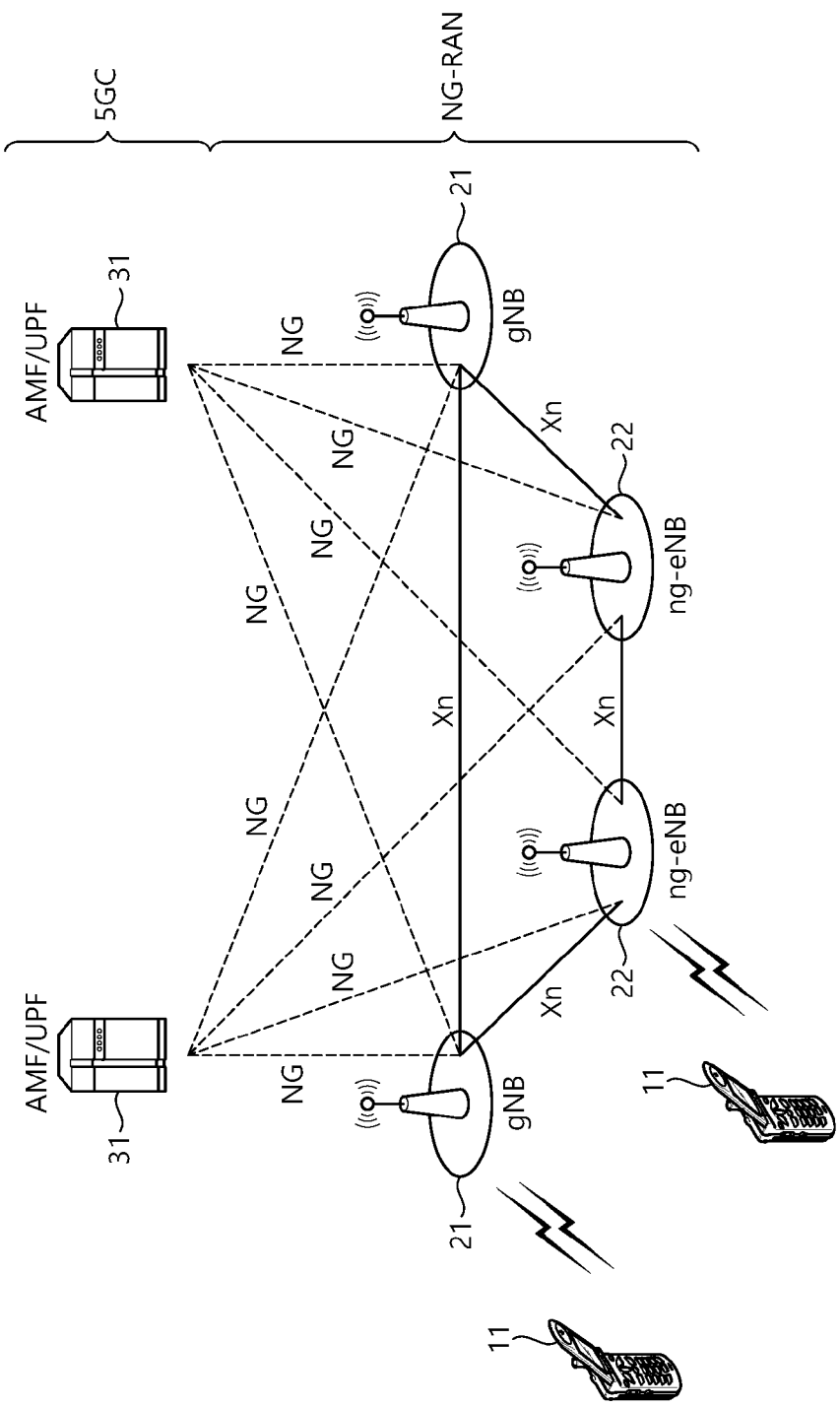

[Fig. 3]
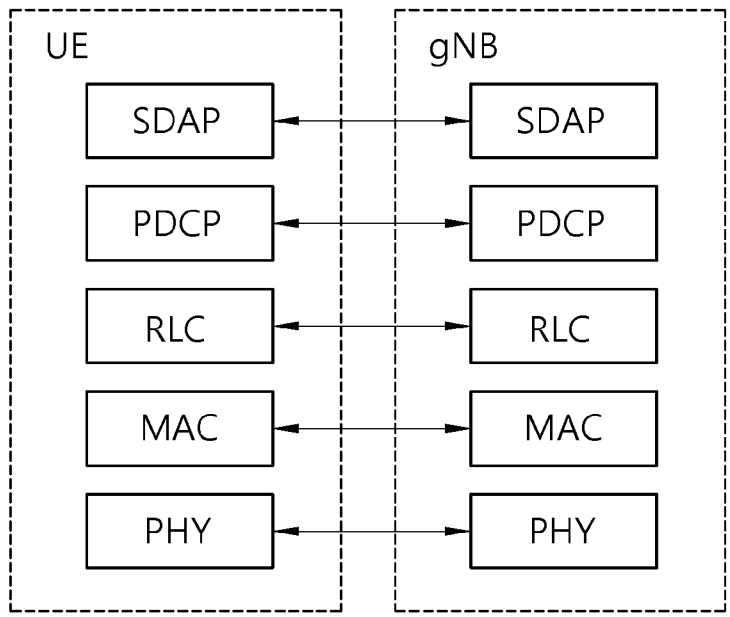
[Fig. 4]
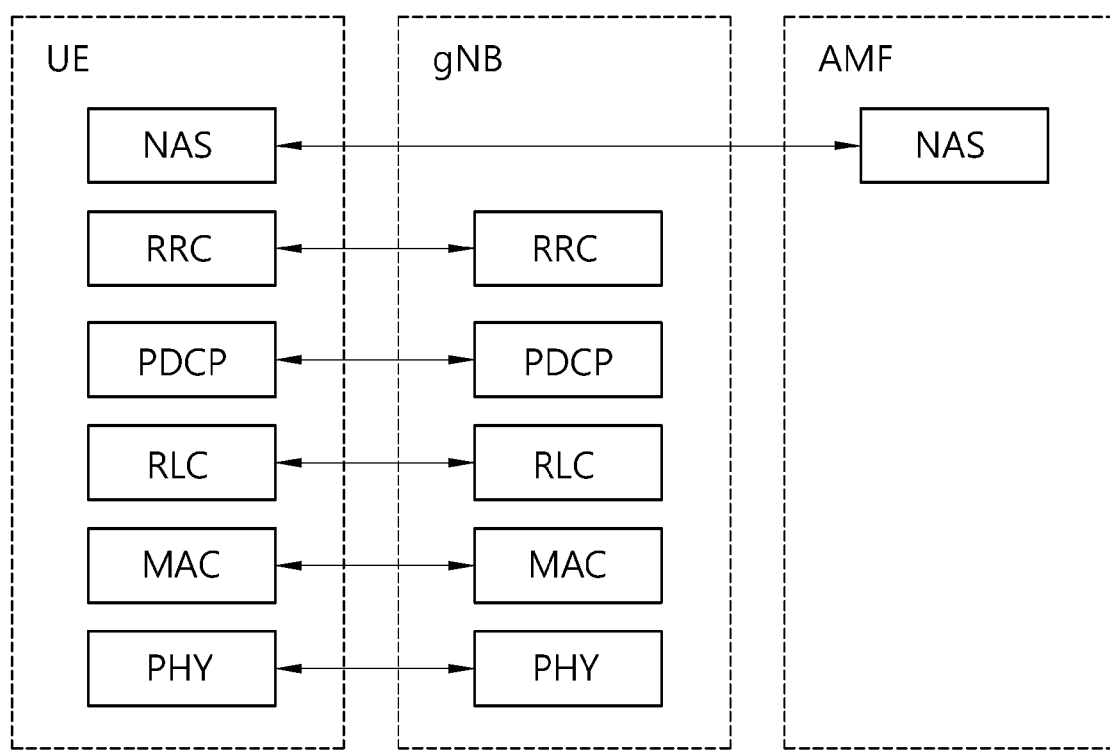

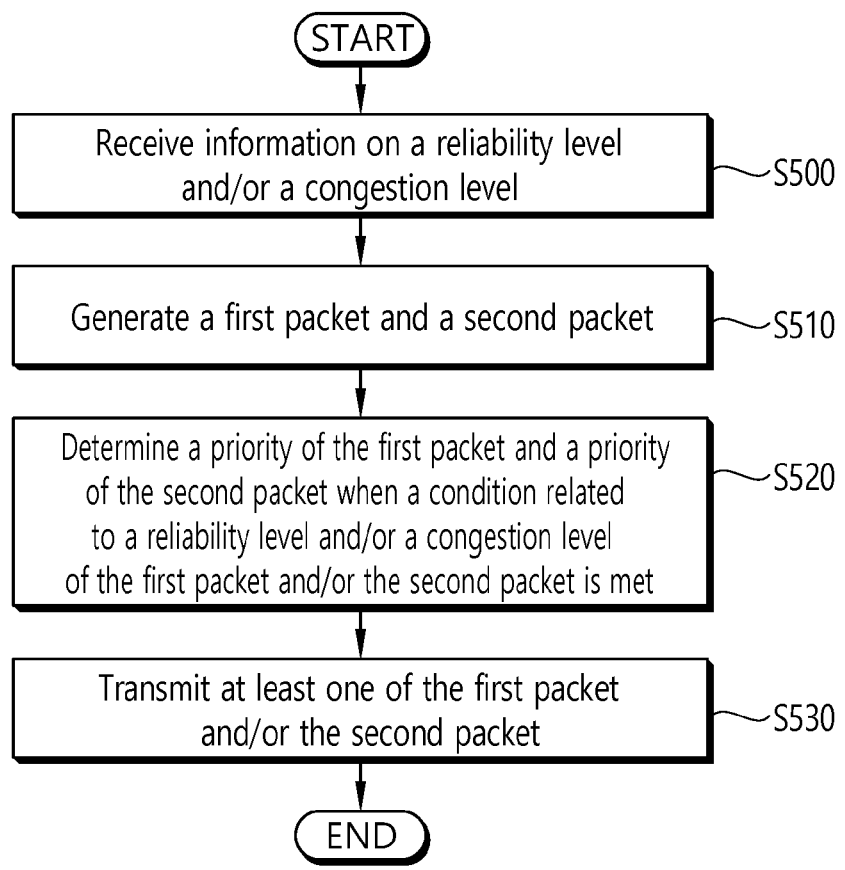
[Fig. 5]

[Fig. 6]
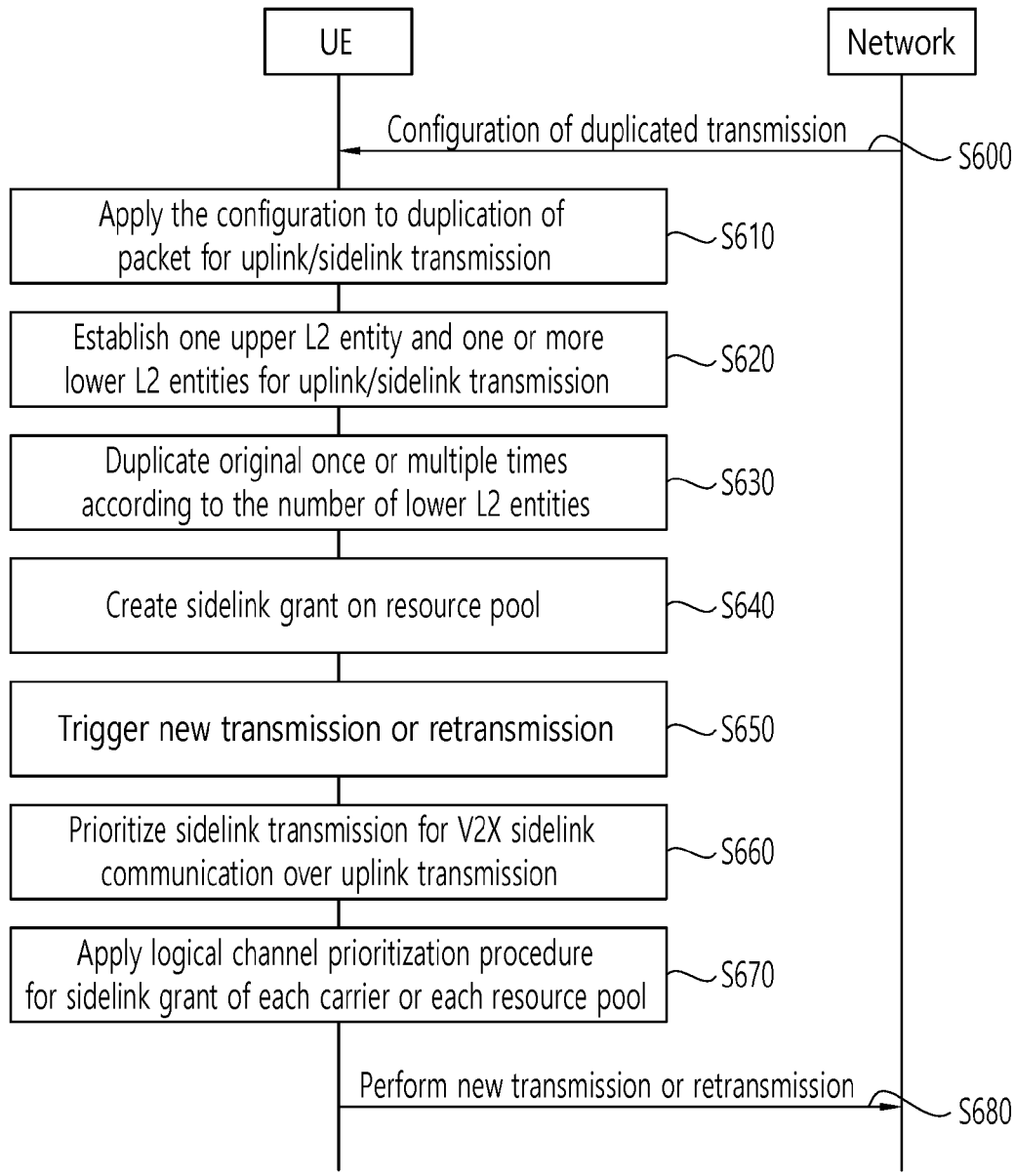
[Fig. 7]
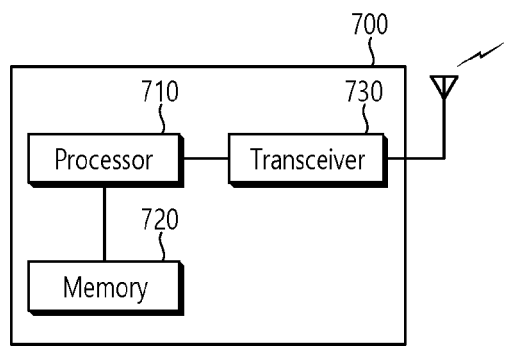

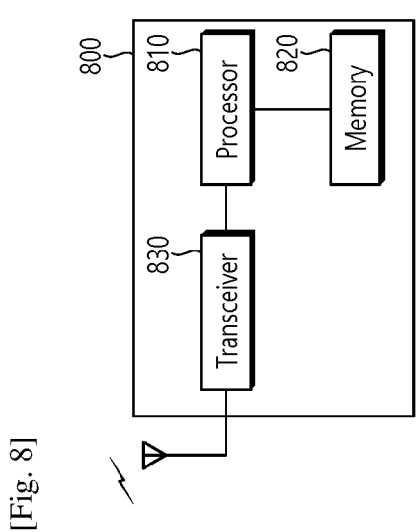
[Fig. 8]

METHOD AND APPARATUS FOR DEPRIORITIZING PACKET TRANSMISSION BASED ON RELIABILITY LEVEL OR CONGESTION LEVEL IN WIRELESS COMMUNICATION SYSTEM

CROSS-REFERENCE TO RELATED APPLICATIONS

This application is a National Stage application under 35 U.S.C. § 371 of International Application No. PCT/KR2019/001663, filed on Feb. 12, 2019, which claims the benefit of U.S. Provisional Application No. 62/629,141, filed on Feb. 12, 2018. The disclosures of the prior applications are incorporated by reference in their entirety.

TECHNICAL FIELD

The present invention relates to wireless communications, and more particularly, to a method and apparatus for deprioritizing a packet transmission based on a reliability level and/or congestion level in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

SUMMARY

In a certain condition, a packet for vehicle-to-everything (V2X) sidelink communication is prioritized over a packet uplink transmission. However, reliability level of a packet to be transmitted and/or congestion level of a carrier and/or a cell on which the packet is to be transmitted is not considered.

In an aspect, a method performed by a user equipment (UE) in a wireless communication system is provided. The method includes receiving information on a reliability level and/or a congestion level from a network, generating a first packet and a second packet, determining a priority of the first packet and/or a priority of the second packet when a condition related to the reliability level and/or the congestion level of the first packet and/or the second packet is met, and transmitting at least one of the first packet and/or the second packet.

In another aspect, a user equipment (UE) in a wireless communication system is provided. The UE includes a memory, a transceiver, and a processor, operably coupled to the memory and the transceiver, and configure to control the transceiver to receive information on a reliability level and/or a congestion level, generate a first packet and a second packet, determine a priority of the first packet and a priority of the second packet when a condition related to the reliability level and/or the congestion level of the first packet and/or the second packet is met, and control the transceiver to transmit at least one of the first packet and/or the second packet.

The packet transmission can be deprioritized based on reliability level and/or congestion level.

BRIEF DESCRIPTION OF THE DRAWINGS

FIG. 1 shows an example of a wireless communication system to which technical features of the present invention can be applied.

FIG. 2 shows another example of a wireless communication system to which technical features of the present invention can be applied.

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows a method for deprioritizing packet transmission based on reliability level and/or congestion level by a UE according to an embodiment of the present invention.

FIG. 6 shows a method for deprioritizing packet transmission based on reliability level and/or congestion level by a UE according to an embodiment of the present invention.

FIG. 7 shows a UE to implement an embodiment of the present invention.

FIG. 8 shows a BS to implement an embodiment of the present invention.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG.

4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink is described. Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

A UE is considered in-coverage for sidelink communication whenever it detects a cell on a public safety ProSe carrier. If the UE is out of coverage for sidelink communication, it can only use the Mode 2. If the UE is in coverage for sidelink communication, it may use the Mode 1 or the Mode 2 as per BS configuration. If the UE is in coverage for sidelink communication, it shall use only the resource allocation mode indicated by BS configuration, unless one of the exceptional cases occurs. When an exceptional case occurs, the UE is allowed to use the Mode 2 temporarily, even though it was configured to use the Mode 1. Resource pool to be used during exceptional case may be provided by BS.

A set of transmission and reception resource pools for SCI when the UE is out of coverage for sidelink communication is pre-configured in the UE. The resource pools for SCI when the UE is in coverage for sidelink communication are configured as follows. The resource pools used for reception are configured by the BS via RRC, in broadcast signaling. The resource pool used for transmission is configured by the BS via RRC, in dedicated or broadcast signaling, if the Mode 2 is used. The resource pool used for transmission is configured by the BS via RRC, in dedicated signaling if the Mode 1 is used. In this case, the BS schedules the specific resource(s) for SCI transmission within the configured reception pools.

A set of transmission and reception resource pools for data when the UE is out of coverage for sidelink communication is pre-configured in the UE. The resource pools for data when the UE is in coverage for sidelink communication are configured as follows. The resource pools used for transmission and reception are configured by the BS via RRC, in dedicated or broadcast signaling, if the Mode 2 is used. There is no resource pool for transmission and reception if the Mode 1 is used.

V2X services and V2X sidelink communication is described. V2X services can consist of the following four different types, i.e. vehicle-to-vehicle (V2V), vehicle-to-infrastructure (V2I), vehicle-to-nomadic (V2N) and vehicle-to-pedestrian (V2P). V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed, as long as either synchronization is performed with the target cell in case BS is configured as synchronization source or synchronization is performed with global navigation satellite system (GNSS) in case GNSS is configured as synchronization source. If the exceptional transmission resource pool is included in the handover command, the UE starts using randomly selected resources from the exceptional transmission resource pool starting from the reception of handover command. If the UE is configured with the Mode 3 in the handover command, the UE continues to use the exceptional transmission resource pool while the timer associated with handover is running. If the UE is configured with the Mode 4 in the target cell, the UE continues to use the exceptional transmission resource pool until the sensing results on the transmission resource pools for the Mode 4 are available. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for the Mode 4 are available.

In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier. If the UE that is authorized for V2X sidelink communication is in-coverage for V2X sidelink communication, it may use the Mode 3 or the Mode 4 as per BS configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

For sidelink SPS, maximum 8 SPS configurations with different parameters can be configured by BS and all SPS configurations can be active at the same time. The activation/deactivation of SPS configuration is signaled via PDCCH by BS. The existing logical channel prioritization based on PPPP is used for sidelink SPS.

UE assistance information can be provided to BS. Reporting of UE assistance information is configured by BS for V2X sidelink communication. The UE assistance information used for V2X sidelink communication includes traffic characteristic parameters (e.g. a set of preferred expected SPS interval, timing offset with respect to subframe 0 of the system frame number (SFN) 0, PPPP and maximum transport block (TB) size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

For controlling channel utilization, the network is able to indicate how the UE adapts its transmission parameters for each transmission pool depending on the channel busy ratio (CBR). The UE measures all the configured transmission pools including exceptional pool. Only data pool is measured for the case scheduling assignment (SA) pool and data pool resources are located adjacently, while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of physical sidelink shared channel (PSSCH) resource block number, range of MCS, maximum limit on channel occupancy ratio. The transmission parameter adaption applies to all transmission pools including exceptional pool.

Sidelink transmission and/or reception resources including exceptional pool for different frequencies for the Mode 3 and Mode 4 may be provided. The sidelink resources for different frequencies can be provided via dedicated signaling, SIB21 and/or pre-configuration. The serving cell may indicate to the UE only the frequency on which the UE may acquire the sidelink resource configuration. If multiple frequencies and associated resource information are provided, it is up to UE implementation to select the frequency among the provided frequencies. The UE shall not use pre-configured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre) configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

Before Rel-14, for sidelink transmission from UE, if there is a MAC PDU to be transmitted in this TTI in uplink, except a MAC PDU obtained from the Msg3 buffer and uplink transmission prioritized by upper layer, the value of the highest priority of the sidelink logical channel(s) in the MAC PDU is lower than, if configured, thresSL-TxPrioritization, and if there is no sidelink discovery gap for transmission or no transmission on physical sidelink discovery channel (PSDCH) at the time of the transmission, the sidelink process of the UE shall instruct the physical layer to generate a sidelink transmission according to the stored sidelink grant.

In addition, for uplink transmission from UE, if a transmission for V2X sidelink communication on the same carrier frequency in this TTI collides with this uplink transmission, and uplink transmission is prioritized by upper layers, and there is no measurement gap at the time of the transmission and, in case of retransmission, the retransmission does not collide with a transmission for a MAC PDU obtained from the Msg3 buffer in this TTI, the HARQ process of the UE shall instruct the physical layer to generate an uplink transmission according to the stored uplink grant.

Namely, the transmission of V2X sidelink communication may be prioritized over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if the value of the highest priority of the sidelink logical channel(s) in the MAC PDU is lower than thresSL-TxPrioritization if thresSL-TxPrioritization is configured.

The sidelink process of the UE may instruct the physical layer to generate a transmission according to the stored sidelink grant if the following conditions are met:

if there is no uplink transmission, or if the MAC entity is able to perform uplink transmissions and transmissions sidelink shared channel (SL-SCH) simultaneously at the time of the transmission, or if there is a MAC PDU to be transmitted in this TTI in uplink, except a MAC PDU obtained from the Msg3 buffer and transmission of V2X sidelink communication is prioritized over uplink transmission as described above; and if there is no sidelink discovery gap for transmission or no transmission on PSDCH at the time of the transmission, or, in case of transmissions of V2X sidelink communication, if the MAC entity is able to perform transmissions on SL-SCH and transmissions on PSDCH simultaneously at the time of the transmission.

Meanwhile, in 3GPP rel-15, packet duplication may be introduced. The packet duplication is performed by PDCP layer. the UE may duplicate the same packet on multiple resource pools and/or mulitple carriers for sidelink transmission. Thus, the UE may transmit one packet on a resource pool of a carrier in sidelink, while transmitting duplicated packet of the same packet on another resource pool of another carrier in sidelink. By the packet duplication, every data packet may be duplicated and transmitted concurrently over two independent networks. Such packet duplication provides seamless redundancy that not only improves reliability but also reduces latency in communication.

As described above, when sidelink transmission for V2X sidelink communication in a TTI collides with uplink transmission (i.e. when the MAC entity is not able to perform uplink transmissions and transmissions of V2X sidelink communication simultaneously), if the value of the highest priority of the sidelink logical channel(s) in the MAC PDU is lower than thresSL-TxPrioritization, the transmission of V2X sidelink communication may be prioritized over uplink transmission. That is, the UE that cannot simultaneously perform both sidelink transmission and uplink transmission may transmit the MAC PDU in sidelink, but the UE will not perform uplink transmission in the TTI. In this prioritization process, reliability level of a packet to be transmitted and/or congestion level of a carrier and/or a cell on which the packet is to be transmitted is not considered. There is no need to prioritize transmission of the packet when the reliability level of the packet is below than a specific level and/or congestion level of a carrier and/or a cell on which the packet is to be transmitted is higher than a certain level.

The present invention proposes a method and apparatus for deprioritizing packet transmission based on reliability level and/or congestion level. Hereinafter, various aspects of the present invention are described according to embodiments of the present invention.

FIG. 5 shows a method for deprioritizing packet transmission based on reliability level and/or congestion level by a UE according to an embodiment of the present invention.

In step S500, the UE receives information on a reliability level and/or a congestion level from a network. The reliability level may be a ProSe per-packet reliability (PPPR) level, and the information on the reliability level may be a threshold for the PPPR level. The lower the PPPR level is, the higher the reliability of the packet to be transmitted is. The congestion level may be a CBR level, and the information on the congestion level may be a threshold for the CBR level. The higher the CBR level is, the higher the congestion of a carrier and/or a cell on which the packet is to be transmitted is.

In step S510, the UE generates a first packet and a second packet. The first packet and the second packet may collide with each other at same time. That is, first packet and the second packet may be generated to be transmitted at the same time. At least one of the first packet or the second packet may be a duplicated packet.

In step S520, the UE determines a priority of the first packet and/or a priority of the second packet when a condition related to the reliability level and/or the congestion level of the first packet and/or the second packet is met.

The condition related to the reliability level of the first packet and/or the second packet may be that the reliability level of the first packet and/or the second packet is lower than the threshold for the reliability level (i.e. the packet has less reliability than the threshold for the reliability level). In this case, the UE may deprioritize the first packet and/or the second packet. That is, the UE may deprioritize the first packet and/or the second packet when the PPPR level of the first packet and/or the second packet is higher than the threshold for the PPPR level.

Or, the condition related to the congestion level of the first packet and/or the second packet may be that the congestion level of the first packet and/or the second packet is higher than the threshold for the CBR level. In this case, the UE deprioritize the first packet and/or the second packet. That is, the UE may deprioritize the first packet and/or the second packet when the congestion level of the first packet and/or the second packet is higher than the threshold for the CBR level.

In step S530, the UE transmits at least one of the first packet and/or the second packet. The first packet and the second packet may be transmitted to different nodes. That is, the first packet may be transmitted to the network, and the second packet may be transmitted to another UE. Or, the first packet may be transmitted to another UE, and the second packet may be transmitted to the network.

In this embodiment, the UE may create one original packet and at least one duplicated packet of the original packet to be transmitted on multiple carriers or multiple cells. If the packet has less reliability than a certain level of reliability indicated by the network (i.e. the reliability level of the packet is lower than a certain reliability level indicated by the network), or if the congestion level of the carrier and/or the cell is higher than a threshold indicated by the network, or if the number of transmissions that the UE has performed in a duration is higher than a threshold indicated by the network, the UE may consider a priority of the duplicated packet as a lower priority than a priority of the original packet for uplink transmission and/or sidelink transmission. For example, if the PPPR level of a packet is lower than a threshold or higher than a threshold, if the CBR level measured on a carrier and/or a resource pool where the packet is to be transmitted is higher than a threshold indicated by the network, or if CR calculated by the UE is higher than a certain CR level indicated by the network for a PPPP level of the packet, the UE may consider a priority of the duplicated packet as the lowest priority compared to priorities of the other packets (i.e. uplink transmission and/or sidelink transmission). The lower the PPPP level is, the higher the priority of the packet to be transmitted is. Or, if the network transmits information on a priority offset to the UE, the UE may consider that a priority of the duplicated packet is equal to [the priority of the original packet—the priority offset]. The network may inform the UE about the threshold or the priority offset.

The priority of a packet may correspond to a logical channel priority of the logical channel where the packet is carried. Or, the priority of a packet may correspond to a PPPP of the logical channel where the packet is carried. Or, the priority of the packet may correspond to a PPPR of the logical channel where the packet is carried. The PPPR of a particular packet defines how reliably the packet should be carried. For each packet and/or for a logical channel of the packet, the UE may determine the reliability level of the packet based on the PPPR of the packet.

The sidelink transmission may correspond to V2X sidelink communication. The uplink transmission may correspond to V2X communication.

When UE detects collision between uplink transmission and sidelink transmission, the MAC entity of the UE (hereinafter, simply as UE MAC) may consider a priority of the duplicated packet as a lower priority than the packet for uplink transmission and/or sidelink transmission. When UE performs logical channel prioritization procedure for uplink transmission and/or sidelink transmission, UE MAC may consider a priority of the duplicated packet as a lower priority than the packet for uplink transmission and/or sidelink transmission. That is, deprioritizing of the duplicated packet may be performed in the logical channel prioritization procedure.

Meanwhile, the physical layer of the UE (hereinafter, simply as UE PHY) may consider the priority of the duplicated packet as the priority of the original packet. For example, in sidelink transmission, when the UE transmits the duplicated packet on SL-SCH, the UE may indicate the value of the priority of the original packet in SCI corresponding to transmission of the duplicated packet on the SL-SCH. For example, when the UE performs sensing or measurement (e.g. CBR) on the resource pool where the duplicated packet is transmitted, the UE may consider the priority of the duplicated packet as the priority of the original packet.

According to the embodiment of the present invention described above, the operation of the UE is as follows. For sidelink transmission in a TTI from UE, when there is a MAC PDU to be transmitted in this TTI in uplink, except a MAC PDU obtained from the Msg3 buffer and uplink transmission of the original packet prioritized by upper layer (due to emergency call in uplink), the sidelink process of the UE may instruct the physical layer to generate a sidelink transmission according to the stored sidelink grant if the following conditions are met:

if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and/or if the CBR measured on a carrier and/or a resource pool where the packet is to be transmitted is lower than a threshold indicated by the network, or if CR calculated by the UE is lower than a certain CR level (e.g. CR_limit) indicated by the network for a PPPP level of the packet; and if the value of the highest priority of the sidelink logical channel(s) in the MAC PDU except the sidelink logical channel(s) carrying a duplicated packet is lower than, if configured, thresSL-TxPrioritization; and if there is no sidelink discovery gap for transmission or no transmission on PSDCH at the time of the transmission.

Therefore, when there is a MAC PDU to be transmitted in this TTI in uplink for uplink transmission of a duplicated packet of the original packet, if the value of the highest priority of the sidelink logical channel(s) in the MAC PDU except the sidelink logical channel(s) carrying a duplicated packet is lower than, if configured, thresSL-TxPrioritization; and if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier and/or a resource pool where the packet is to be transmitted is lower than a threshold indicated by the network, or if the number of sidelink transmissions that the UE has performed in a duration (e.g. CR calculated by the UE) is lower than a CR_limit indicated by the network for a PPPP level of a packet; and if there is no sidelink discovery gap for transmission or no transmission on PSDCH at the time of the transmission, the sidelink process of the UE may instruct the physical layer to generate a sidelink transmission according to the stored sidelink grant.

According to embodiment of the present invention shown in FIG. 5, a priority of the packet can be determined based on reliability level (e.g. PPPR) and/or congestion level (e.g. CBR). Therefore, when the reliability level of the packet is below than a specific level and/or congestion level of a carrier and/or a cell on which the packet is to be transmitted is higher than a certain level, the packet transmission can be deprioritized.

FIG. 6 shows a method for deprioritizing packet transmission based on reliability level and/or congestion level by a UE according to an embodiment of the present invention. FIG. 6 shows a detailed example of a method for deprioritizing packet transmission based on reliability level and/or congestion which is shown in FIG. 5. The UE/network performs the following steps according to the embodiment of the present invention.

In step S600, the network (i.e. gNB or eNB) transmits a configuration of duplicated transmission to the UE. The configuration may include one or more of the following parameters for uplink and/or sidelink transmission.

(1) Information on the maximum allowed number of duplicated packets of one (original) packet for the UE: The packet may correspond to PDCP PDU, PDCP SDU, RLC PDU, RLC SDU, MAC SDU, and/or MAC PDU. The original packet and the duplicated packet of the original packet may be carried over different logical channels. Different duplicated packets of the original packet may be carried over different logical channels.

(2) Information on whether duplication is allowed for sidelink transmission or not This information may be provided for each ProSe destination; or This information may be provided for each pair of ProSe source and ProSe destination; or This information may be provided for each UE; or This information may be provided for each logical channel; or This information may be provided for each logical channel priority; or This information may be provided for each logical channel group; or This information may be provided for each PPPP value; or This information may be provided for each PPPR value; or This information may be provided for each resource pool; or This information may be provided for each carrier; or This information may be provided for each cell; or This information may be provided for each bandwidth part (BWP) of a cell; or This information may be is provided for each of V2V, V2I and V2P.

(3) Information on whether duplication is allowed for uplink transmission or not This information may be provided for each UE; or This information may be provided for each logical channel; or This information may be provided for each logical channel priority; or This information may be provided for each logical channel group; or This information may be provided for each of V2V, V2I and V2P;

This information may be provided for each QoS class identifier (QCI); or

This information may be provided for each level of reliability; or

This information may be provided for each carrier; or

This information may be provided for each cell; or

This information may be provided for each BWP of a cell.

(4) Information on the priority offset compared to the priority of the logical channel of an original packet, and/or the priority of the logical channel of a duplicated packet.

(5) Information on the logical channel to be prioritized or deprioritized for uplink and/or sidelink transmission (6) Information on the ProSe destination to be prioritized or deprioritized for sidelink transmission (7) Information on the carrier to be prioritized or deprioritized for uplink and/or sidelink transmission (8) Information on the cell to be prioritized or deprioritized for uplink and/or sidelink transmission (9) Information on the resource pool to be prioritized or deprioritized for sidelink transmission In step S610, upon receiving the configuration of duplicated transmission, the UE applies the configuration to duplication of a packet for uplink and/or sidelink transmission.

In step S620, based on the configuration of duplicated transmission, the UE establishes one upper L2 entity (e.g. one PDCP entity) and one or more lower L2 entities (e.g. one or more RLC entities) mapped to the upper L2 entity for uplink and/or sidelink transmission. Each lower L2 entity may be associated with one logical channel for uplink and/or sidelink transmission. Different lower L2 entities may be associated with different logical channels. The UE may establish lower L2 entities and configure the associated logical channels based on the maximum allowed number of duplicated packets of one (original) packet for the UE. For example, when the maximum allowed number of duplicated packets of one (original) packet is 2, two lower L2 entities may be established.

Each logical channel may be associated with a priority. The priority may correspond to either logical channel priority in uplink or a PPPP in sidelink.

In step S630, if an original packet becomes available for transmission in the upper L2 entity, the upper L2 entity duplicates the original packet once or multiple times based on the number of lower L2 entities.

More specifically, a layer (e.g. NAS layer) above the upper L2 entity (e.g. PDCP entity) may inform lower L2 layers (e.g. PDCP, RLC, MAC layers) about carriers and ProSe destination for each original packet (e.g. PDCP SDU). The upper L2 entity may determine whether to perform duplication of the original packet based on the PPPR value of the packet, if duplication is allowed based on the configuration of duplicated transmission received in step S600.

If one upper L2 entity is mapped to more than one lower L2 entity, one lower L2 entity among them may be used to carry the original packet while the other lower L2 entities may be used to carry the duplicated packets of the original packets. Each logical channel of each lower L2 entity may be mapped to one or more carriers, and/or one or more resource pools. The network (i.e. gNB or eNB) may transmit information on which carrier and/or resource pool the duplication is allowed in to the UE. In addition, gNB or eNB may indicate to the UE whether or not duplication of a packet is allowed for a particular value of PPPR of the packet. For example, gNB or eNB may indicate to the UE a threshold for the PPPR value, and UE may consider that the duplication of a packet with a PPPR value above the threshold is allowed. Alternatively, gNB or eNB may indicate to the UE a threshold for the PPPR value, and the UE may consider that the duplication of a packet with a PPPR value below the threshold is allowed. Then, the UE may perform duplication if there is a lower L2 entity of the logical channel where the duplication is allowed.

In step S640, if data is available for a sidelink logical channel and if the UE is configured with a resource pool, the UE creates a sidelink grant on the resource pool. If data is available for a sidelink logical channel and if the UE is configured with sidelink buffer status report (BSR), the UE may transmit sidelink BSR MAC control element (CE) to the network (i.e. gNB or eNB). Then, the UE may receive sidelink grant from the network (i.e. gNB or eNB).

If data is available for an uplink logical channel, the UE may send BSR MAC CE to the network (i.e. gNB or eNB). Then, the UE may receive uplink grant from the network (i.e. gNB or eNB).

In step S650, for each subframe of the SL-SCH and each Sidelink process, the sidelink HARQ entity of the UE performs as follows. There may be one sidelink HARQ entity at the MAC entity for transmission on SL-SCH, which maintains a number of parallel sidelink processes. Different Sidelink HARQ entities may exist for the original packet and a duplicated packet of the original packet. Different sidelink HARQ entities may exist for different duplicated packets of the original packet.

1> if a sidelink grant corresponding to a new transmission opportunity has been indicated for this sidelink process and there is SL data, for sidelink logical channels of ProSe destination associated with this sidelink grant, available for transmission:

2> obtain the MAC PDU from the "Multiplexing and assembly" entity;

2> deliver the MAC PDU and the sidelink grant and the HARQ information to this Sidelink process;

2> instruct this sidelink process to trigger a new transmission.

1> else, if this subframe corresponds to retransmission opportunity for this sidelink process:

2> instruct this Sidelink process to trigger a retransmission.

For each TTI in uplink transmission, the HARQ entity of the UE performs as follows.

1> identify the HARQ process(es) associated with this TTI, and for each identified HARQ process:

2> if an uplink grant has been indicated for this process and this TTI:

3> if the received grant was not addressed to a temporary cell radio network temporary identity (C-RNTI) on PDCCH and if the new data indicator (NDI) provided in the associated HARQ information has been toggled compared to the value in the previous transmission of this HARQ process; or 3> if the uplink grant was received on PDCCH for the C-RNTI and the HARQ buffer of the identified process is empty; or 3> if the uplink grant was received in a random access response:

4> if there is a MAC PDU in the Msg3 buffer and the uplink grant was received in a random access response:

5> obtain the MAC PDU to transmit from the Msg3 buffer.

4> else if the MAC entity is configured with semiPersistSchedIntervalUL shorter than 10 subframes and if the uplink grant is a configured grant, and if the HARQ buffer of the identified HARQ process is not empty, and if HARQ_FEEDBACK of the identified HARQ process is NACK; or if the MAC entity is configured with ul-SchedInterval shorter than 10 subframes and if the uplink grant is a preallocated uplink grant, and if the HARQ buffer of the identified HARQ process is not empty, and if HARQ_FEEDBACK of the identified HARQ process is NACK:

5> instruct the identified HARQ process to generate a non-adaptive retransmission.

4> else:

5> obtain the MAC PDU to transmit from the "Multiplexing and assembly" entity, if any;

4> if a MAC PDU to transmit has been obtained:

5> deliver the MAC PDU and the uplink grant and the HARQ information to the identified HARQ process;

5> instruct the identified HARQ process to trigger a new transmission.

3> else:

4> if the MAC entity is configured with skipUplinkTxSPS and if the uplink grant received on PDCCH was addressed to the Semi-Persistent Scheduling C-RNTI and if the HARQ buffer of the identified process is empty:

5> ignore the uplink grant;

4> else:

5> deliver the uplink grant and the HARQ information (redundancy version) to the identified HARQ process;

5> instruct the identified HARQ process to generate an adaptive retransmission.

2> else, if the HARQ buffer of this HARQ process is not empty:

3> instruct the identified HARQ process to generate a non-adaptive retransmission.

In step S660, the sidelink process of the UE prioritizes the sidelink transmission of V2X sidelink communication over uplink transmission. At least one of the followings options may be used for prioritizing the sidelink transmission of V2X sidelink communication over uplink transmission. That is, the following options describe various schemes for prioritizing the sidelink transmission of V2X sidelink communication over uplink transmission.

(1) Option 1

The UE may prioritize the sidelink transmission of V2X sidelink communication over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if the value of the highest priority of the sidelink logical channel(s) in the MAC PDU is lower than thresSL-TxPrioritization if thresSL-TxPrioritization is configured; and f the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier or a resource pool where the packet is to be transmitted is lower than a threshold indicated by the network, or if the number of sidelink transmissions that the UE has performed in a duration is lower than a CR_limit indicated by the network for a PPPP level of the packet; and if a MAC PDU of the sidelink transmission includes the original packet or a MAC PDU of the sidelink transmission includes only the duplicated packet(s).

(2) Option 2

The UE may prioritize the sidelink transmission of V2X sidelink communication over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier or a resource pool where the packet is to be transmitted is lower than a threshold indicated by the network, or if the number of sidelink transmissions that the UE has performed in a duration is lower than a CR_limit indicated by the network for a PPPP level of the packet; and if the value of the highest priority of the sidelink logical channel(s) in the MAC PDU except the sidelink logical channel(s) carrying the duplicated packets (or the deprioritized sidelink logical channel(s) indicated by the configuration of duplicated transmission received in step S600) is lower than thresSL-TxPrioritization if thresSL-TxPrioritization is configured for the sidelink logical channel(s) in the MAC PDU.

That is, in this option, the UE does not apply thresSL-TxPrioritization to the sidelink logical channel(s) carrying the duplicated packets, unless the sidelink logical channel(s) carrying the duplicated packets requires high reliability based on the PPPR of the packet and the threshold configured by the network.

Alternatively, the UE may not apply thresSL-TxPrioritization to the deprioritized sidelink logical channel(s) indicated by the configuration of duplicated transmission received in step S600, unless the sidelink logical channel(s) carrying the duplicated packets requires high reliability based on the PPPR of the packet and the threshold configured by the network. Thus, the UE may prioritize the sidelink transmission of V2X sidelink communication over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier or a resource pool where the packet is to be transmitted is lower than a threshold indicated by the network, or if the number of sidelink transmissions that the UE has performed in a duration is lower than a CR_limit indicated by the network for a PPPP level of the packet; and if the value of the highest priority of the sidelink logical channel(s) in the MAC PDU is lower than thresSL-TxPrioritization if thresSL-TxPrioritization is configured for the sidelink logical channel(s) in the MAC PDU.

(3) Option 3

The UE may prioritizes the sidelink transmission of V2X sidelink communication over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier or a resource pool where the packet is to be transmitted is lower than a threshold indicated by the network, or if the number of sidelink transmissions that the UE has performed in a duration is lower than a CR_limit indicated by the network for a PPPP level of the packet; and if the value of the highest priority of the sidelink logical channel(s) in the MAC PDU is lower than thresSL-TxPrioritization if thresSL-TxPrioritization is configured.

For the above prioritization, the UE may consider the priority of the sidelink logical channel(s) carrying the duplicated packet as the lowest priority over all sidelink logical channels. The logical channel priority, the PPPP, or the PPPR may be the priority.

Alternatively, the UE may consider the priority of the sidelink logical channel(s) carrying the duplicated packet as a lower priority than the priority of the sidelink logical channel carrying the original packet. The UE may adjust the priority of the sidelink logical channel(s) carrying the duplicated packet based on the configuration of duplicated transmission received in step S600 as follows:

If the configuration of duplicated transmission received in step S600 includes information on the priority offset compared to the priority of the logical channel of an original packet, the priority of the sidelink logical channel(s) carrying the duplicated packet may be equal to [the priority of the sidelink logical channel of the original packet—the priority offset].

If the configuration of duplicated transmission received in step S600 includes information on the priority of the logical channel of a duplicated packet, the priority of the sidelink logical channel(s) carrying the duplicated packet may be the configured priority.

(4) Option 4

The UE may prioritize the sidelink transmission of V2X sidelink communication over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if a MAC PDU of the sidelink transmission contains a MAC SDU from the logical channel prioritized by the configuration of duplicated transmission received in step S600, or a MAC PDU of the sidelink transmission contains no MAC SDU from the logical channel deprioritized by the configuration of duplicated transmission received in step S600; and if a MAC PDU of the sidelink transmission contains a MAC SDU for the ProSe destination prioritized by the configuration of duplicated transmission received in step S600, or a MAC PDU of the sidelink transmission contains no MAC SDU for the ProSe destination deprioritized by the configuration of duplicated transmission received in step S600; and if a MAC PDU of the sidelink transmission is to be transmitted with the sidelink grant on the resource pool (or on the carrier or on the cell) prioritized by the configuration of duplicated transmission received in step S600, or a MAC PDU of the sidelink transmission is not to be transmitted with the sidelink grant on the resource pool (or on the carrier or on the cell) deprioritized by the configuration of duplicated transmission received in step S600; and if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier or a resource pool where the packet is to be transmitted is lower than a threshold indicated by the network, or if the number of sidelink transmissions that the UE has performed in a duration is lower than a CR_limit indicated by the network for a PPPP level of the packet; and if the value of the highest priority of the sidelink logical channel(s) in the MAC PDU is lower than thresSL-TxPrioritization if thresSL-TxPrioritization is configured.

(5) Option 5

The UE may prioritizes the sidelink transmission of V2X sidelink communication over uplink transmission if the following conditions are met:

if the MAC entity is not able to perform uplink transmissions and transmissions of V2X sidelink communication simultaneously at the time of the transmission; and if uplink transmission is not prioritized by upper layer (due to emergency call in uplink); and if a MAC PDU of the uplink transmission includes no original packet or a MAC PDU of the uplink transmission includes only the duplicated packet(s); and if a MAC PDU of the uplink transmission does not contain a MAC SDU from the logical channel prioritized by the configuration of duplicated transmission received in step S600, or a MAC PDU of the uplink transmission contains only a MAC SDU(s) from the logical channel deprioritized by the configuration of duplicated transmission received in step S600; and if a MAC PDU of the uplink transmission is not to be transmitted with the uplink grant on the cell (or on the carrier) prioritized by the configuration of duplicated transmission received in step S600, or a MAC PDU of the uplink transmission is to be transmitted with the uplink grant on the cell (or on the carrier) deprioritized by the configuration of duplicated transmission received in step S600; and if the value of the highest PPPR value of the sidelink logical channel(s) in the MAC PDU is lower than a threshold configured by the network (Alternatively, if the value of the lowest PPPR value of the sidelink logical channel(s) in the MAC PDU is higher than a threshold configured by the network); and if the CBR measured on a carrier or a resource pool where the packet is to be transmitted is lower than a threshold indicated by the network, or if the number of sidelink transmissions that the UE has performed in a duration is lower than a CR_limit indicated by the network for a PPPP level of the packet; and if the value of the highest priority of the sidelink logical channel(s) in the MAC PDU is lower than thresSL-TxPrioritization if thresSL-TxPrioritization is configured; or if a MAC PDU of the sidelink transmission contains no MAC SDU from the logical channel prioritized by the configuration of duplicated transmission received in step S600; or if a MAC PDU of the sidelink transmission contains only MAC SDU(s) from the logical channel deprioritized by the configuration of duplicated transmission received in step S600; or if a MAC PDU of the sidelink transmission contains no MAC SDU for the ProSe destination prioritized by the configuration of duplicated transmission received in step S600; or if a MAC PDU of the sidelink transmission contains only MAC SDU(s) for the ProSe destination deprioritized by the configuration of duplicated transmission, received in step S600; or if a MAC PDU of the sidelink transmission is not to be transmitted with the sidelink grant on the resource pool (or on the carrier or on the cell) prioritized by the configuration of duplicated transmission received in step S600; or if a MAC PDU of the sidelink transmission is to be transmitted with the sidelink grant on the resource pool (or on the carrier or on the cell) deprioritized by the configuration of duplicated transmission received in step S600.

Then, the HARQ process of the UE may prioritizes the uplink transmission over sidelink transmission of V2X sidelink communication, if the transmission of V2X sidelink communication is not prioritized as described above in case there is a configured sidelink grant for transmission of V2X sidelink communication on SL-SCH in this TTI.

In other words, if the MAC entity is not able to perform uplink transmissions and transmissions of V2X sidelink communication simultaneously at the time of the transmission, the UE may prioritize the uplink transmission over sidelink transmission of V2X sidelink communication if one of the following conditions is met:

if uplink transmission is prioritized by upper layer (due to emergency call in uplink); or if the value of the highest PPPR value of the sidelink logical channel(s) in the MAC PDU is equal to or higher than a threshold configured by the network (Alternatively, if the value of the lowest PPPR value of the sidelink logical channel(s) in the MAC PDU is equal to or lower than a threshold configured by the network); and if the CBR measured on a carrier or a resource pool where the packet is to be transmitted in sidelink is higher than a threshold indicated by the network, or if the number of sidelink transmissions that the UE has performed in a duration is higher than a CR_limit indicated by the network for a PPPP level of the packet of sidelink transmission;

if the value of the highest priority of the sidelink logical channel(s) in the MAC PDU is equal to or higher than thresSL-TxPrioritization if thresSL-TxPrioritization is configured for the sidelink logical channel(s); or if a MAC PDU of the sidelink transmission includes no original packet or a MAC PDU of the sidelink transmission includes only the duplicated packet(s); or if a MAC PDU of the uplink transmission includes an original packet or a MAC PDU of the uplink transmission includes no duplicated packet(s); or if a MAC PDU of the uplink transmission contains a MAC SDU from the logical channel prioritized by the configuration of duplicated transmission received in step S600; or if a MAC PDU of the uplink transmission is to be transmitted with the uplink grant on the cell (or on the carrier) prioritized by the configuration of duplicated transmission received in step S600, or a MAC PDU of the uplink transmission is not to be transmitted with the uplink grant on the cell (or on the carrier) deprioritized by the configuration of duplicated transmission received in step S600.

In step S670, for sidelink, UE MAC applies the logical channel prioritization procedure for sidelink grant of each carrier and/or each resource pool mapped to a packet of a sidelink logical channel when a new transmission is performed with the sidelink grant. Each sidelink logical channel may have an associated priority, which may be the PPPP. Multiple sidelink logical channels may have the same associated priority.

The network may deprioritize sidelink transmission of a sidelink logical channel of the duplicated packet. Thus, for this step (including Step A0, A1 and A2 described below), if the sidelink logical channel is deprioritized or not prioritized by the configuration of duplicated transmission received in step S600, if the value of the PPPR of the sidelink logical channel is equal to or higher than a certain threshold indicated by the network (Alternatively, if the value of the PPPR of the sidelink logical channel is equal to or lower than a certain threshold indicated by the network), or if the CBR measured on a carrier or a resource pool where the packet is to be transmitted in sidelink is higher than a threshold indicated by the network, or if the number of sidelink transmissions that the UE has performed in a duration is higher than a CR_limit indicated by the network for a PPPP level of the packet of sidelink transmission, or if the value of the priority of the sidelink logical channel is equal to or higher than a certain threshold indicated by the network, if the ProSe Destination selected in Step A0 is deprioritized or not prioritized by the configuration of duplicated transmission received in step S600, or if the transmission is performed with sidelink grant on the resource pool (or the carrier or the cell) deprioritized or not prioritized by the configuration of duplicated transmission received in step S600, the UE performs one of the followings:

The UE may consider the priority of the sidelink logical channel(s) carrying the duplicated packet as the lowest priority over all sidelink logical channels; or The UE may consider the priority of the sidelink logical channel(s) carrying the duplicated packet as a lower priority than the priority of the sidelink logical channel carrying the original packet. The UE may adjust the priority of the sidelink logical channel(s) carrying the duplicated packet based on the configuration of duplicated transmission received in step S600.

The logical channel priority, the PPPP, or the PPPR may be the priority.

The MAC entity of the UE may perform the following logical channel prioritization procedure for each SCI corresponding to a new transmission in V2X sidelink communication:

1> The MAC entity shall allocate resources to the sidelink logical channels in the following steps:

2> Step A0: Select a ProSe destination, having the sidelink logical channel with the highest priority, among the sidelink logical channels having data available for transmission;

1> For each MAC PDU associated to the SCI:
2> Step A1: Among the sidelink logical channels belonging to the selected ProSe destination and having data available for transmission, allocate resources to the sidelink logical channel with the highest priority;
2> Step A2: if any resources remain, sidelink logical channels belonging to the selected ProSe destination are served in decreasing order of priority until either the data for the sidelink logical channel(s) or the SL grant is exhausted, whichever comes first. Sidelink logical channels configured with equal priority should be served equally.
1> The UE shall also follow the rules below during the scheduling procedures above:
2> The UE should not segment an RLC SDU (or partially transmitted SDU) if the whole SDU (or partially transmitted SDU) fits into the remaining resources;
2> If the UE segments an RLC SDU from the sidelink logical channel, it shall maximize the size of the segment to fill the grant as much as possible;
2> The UE should maximize the transmission of data;
2> if configured by the network, the UE should not include a packet and a duplicated packet of the packet in the same MAC PDU or different MAC PDUs to be scheduled or transmitted on the same frequency (or the same cell);
2> if configured by the network, the UE should not include duplicated packets of a packet in the same MAC PDU or different MAC PDUs to be scheduled or transmitted on the same frequency (or the same cell);
2> If the MAC entity is given a sidelink grant size that is equal to or larger than 10 bytes (for sidelink communication) or 11 bytes (for V2X sidelink communication) while having data available for transmission, the MAC entity shall not transmit only padding.
2> the MAC entity shall only consider logical channels for which the sidelink logical channel, the selected ProSe destination, the ProSe source, duplication, the PPPP of the sidelink logical channel, or the PPPR of the sidelink logical channel is allowed.

For uplink, the logical channel prioritization procedure is applied when a new transmission is performed. RRC controls the scheduling of uplink data by signalling for each logical channel: priority where an increasing priority value indicates a lower priority level, prioritisedBitRate which sets the prioritized bit rate (PBR), bucketSizeDuration which sets the bucket size duration (BSD).

The MAC entity shall maintain a variable $Bj$ for each logical channel j. $Bj$ shall be initialized to zero when the related logical channel is established, and incremented by the product PBR X TTI duration for each TTI, where PBR is prioritized bit rate of logical channel j. However, the value of $Bj$ can never exceed the bucket size and if the value of $Bj$ is larger than the bucket size of logical channel j, it shall be set to the bucket size. The bucket size of a logical channel is equal to PBR X BSD, where PBR and BSD are configured by upper layers.

The bucket size of a logical channel carrying a duplicated packet of an original packet cannot exceed the bucket size of a logical channel carrying the original packet. If the bucket size of the logical channel carrying the original packet is larger than the bucket size of the logical channel carrying a duplicated packet of the original packet, it shall be set to the bucket size of the logical channel carrying a duplicated packet of the original packet.

The value of $Bj$ for the logical channel j carrying a duplicated packet of the original packet can never exceed the value of $Bn$ for the logical channel n carrying the original packet. If the value of $Bj$ is larger than the value of $Bn$, it shall be set to the value of $Bn$.

The network may deprioritize uplink transmission of a logical channel of the duplicated packet. Thus, for this step (including Step B1, B2 and B3 described below), if the logical channel is deprioritized or not prioritized by the configuration of duplicated transmission received in step S600, if the reliability level of the logical channel is equal to or higher than a certain threshold indicated by the network (Alternatively, if the reliability level of the logical channel is equal to or lower than a certain threshold indicated by the network), or if the congestion level on a carrier or a cell where the packet is to be transmitted is higher than a threshold indicated by the network, or if the number of uplink transmissions that the UE has performed in a duration is higher than a certain threshold indicated by the network for the carrier or the cell, or if the value of the priority of the logical channel is equal to or higher than a certain threshold indicated by the network, or if the transmission is performed with uplink grant on the cell (or the carrier) deprioritized or not prioritized by the configuration of duplicated transmission received in step S600, the UE performs one of the followings:

The UE may consider the priority of the logical channel(s) carrying the duplicated packet as the lowest priority over all logical channels; or The UE may consider the priority of the logical channel(s) carrying the duplicated packet as a lower priority than the priority of the logical channel carrying the original packet. The UE may adjust the priority of the logical channel(s) carrying the duplicated packet based on the configuration of duplicated transmission received in step S600.

The MAC entity may perform the following logical channel prioritization procedure when a new transmission is performed:
1> The MAC entity shall allocate resources to the logical channels in the following steps:
2> Step B1: All the logical channels with $Bj>0$ are allocated resources in a decreasing priority order. If the PBR of a logical channel is set to "infinity", the MAC entity shall allocate resources for all the data that is available for transmission on the logical channel before meeting the PBR of the lower priority logical channel(s);
2> Step B2: the MAC entity shall decrement $Bj$ by the total size of MAC SDUs served to logical channel j in Step 1. The value of $Bj$ can be negative.
2> Step B3: if any resources remain, all the logical channels are served in a strict decreasing priority order (regardless of the value of $Bj$) until either the data for that logical channel or the UL grant is exhausted, whichever comes first. Logical channels configured with equal priority should be served equally.
1> The UE shall also follow the rules below during the scheduling procedures above:
2> The UE should not segment an RLC SDU (or partially transmitted SDU or retransmitted RLC PDU) if the whole SDU (or partially transmitted SDU or retransmitted RLC PDU) fits into the remaining resources of the associated MAC entity;
2>If the UE segments an RLC SDU from the logical channel, it shall maximize the size of the segment to fill the grant of the associated MAC entity as much as possible;
2> The UE should maximize the transmission of data.
2> if configured by the network, the UE should not include a packet and a duplicated packet of the packet in the same MAC PDU or different MAC PDUs to be scheduled or transmitted on the same frequency (or the same cell);

2> if configured by the network, the UE should not include duplicated packets of a packet in the same MAC PDU or different MAC PDUs to be scheduled or transmitted on the same frequency (or the same cell);

2> If the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);

2> For transmissions on serving cells operating according to frame structure Type 3, the MAC entity shall only consider logical channels for which laa-Allowed has been configured.

The MAC entity shall not transmit data for a logical channel corresponding to a radio bearer that is suspended.

If the MAC PDU includes only the MAC CE for padding BSR or periodic BSR with zero MAC SDUs and there is no aperiodic CSI requested for this TTI, the MAC entity shall not generate a MAC PDU for the HARQ entity in the following cases:

in case the MAC entity is configured with skipUplinkTx-Dynamic and the grant indicated to the HARQ entity was addressed to a C-RNTI; or in case the MAC entity is configured with skipUplinkTxSPS and the grant indicated to the HARQ entity is a configured uplink grant;

For the logical channel prioritization procedure, the MAC entity shall take into account the following relative priority in decreasing order:

MAC CE for C-RNTI or data from uplink common control channel (UL-CCCH);

MAC CE for data volume and power headroom report (DPR);

MAC CE for semi-persistent scheduling (SPS) confirmation;

MAC CE for BSR, with exception of BSR included for padding;

MAC CE for PHR, extended PHR, or dual connectivity PHR;

MAC CE for Sidelink BSR, with exception of Sidelink BSR included for padding;

Data from any logical channel, except data from UL-CCCH, data from a logical channel carrying a duplicated packet and data from a logical channel deprioritized or not prioritized by the configuration of duplicated transmission received in step S600;

MAC CE for recommended bit rate query;

MAC CE for BSR included for padding;

MAC CE for sidelink BSR included for padding;

Data from a logical channel carrying a duplicated packet and data from a logical channel deprioritized or not prioritized by the configuration configuration of duplicated transmission received in step S600, except data from UL-CCCH.

When the MAC entity is requested to transmit multiple MAC PDUs in one TTI, steps A0 to A2 and/or B1 to B3 and the associated rules may be applied either to each grant independently or to the sum of the capacities of the grants. Also the order in which the grants are processed may be left up to UE implementation. It may be up to the UE implementation to decide in which MAC PDU a MAC control element is included when MAC entity is requested to transmit multiple MAC PDUs in one TTI. When the UE is requested to generate MAC PDU(s) in two MAC entities in one TTI, it may be up to UE implementation in which order the grants are processed.

In step S680, the UE transmits packets to the network (i.e. gNB or eNB) or another UE based on priorities of each packet. The UE may perform new transmission or retransmission.

According to embodiment of the present invention shown in FIG. 6, a priority of the packet can be determined based on reliability level (e.g. PPPR) and/or congestion level (e.g. CBR). Specifically, the priority of the duplicated packet can be determined based on reliability level (e.g. PPPR) and/or congestion level (e.g. CBR). Therefore, when the reliability level of the duplicated packet is below than a specific level and/or congestion level of a carrier and/or a cell on which the duplicated packet is to be transmitted is higher than a certain level, the transmission of the duplicated packet can be deprioritized.

FIG. 7 shows a UE to implement an embodiment of the present invention. The present invention described above for UE side may be applied to this embodiment.

A UE 700 includes a processor 710, a memory 720 and a transceiver 730. The processor 710 may be configured to implement proposed functions, procedures and/or methods described in this description. Layers of the radio interface protocol may be implemented in the processor 710.

Specifically, the processor 710 is configured to control the transceiver 730 to receive information on a reliability level and/or a congestion level from a network. The reliability level may be PPPR level, and the information on the reliability level may be a threshold for the PPPR level. The lower the PPPR level is, the higher the reliability of the packet to be transmitted is. The congestion level may be a CBR level, and the information on the congestion level may be a threshold for the CBR level. The higher the CBR level is, the higher the congestion of a carrier and/or a cell on which the packet is to be transmitted is.

The processor 710 is configured to generate a first packet and a second packet. The first packet and the second packet may collide with each other at same time. That is, first packet and the second packet may be generated to be transmitted at the same time. At least one of the first packet or the second packet may be a duplicated packet.

The processor 710 is configured to determine a priority of the first packet and/or a priority of the second packet when a condition related to the reliability level and/or the congestion level of the first packet and/or the second packet is met.

The condition related to the reliability level of the first packet and/or the second packet may be that the reliability level of the first packet and/or the second packet is lower than the threshold for the reliability level (i.e. the packet has less reliability than the threshold for the reliability level). In this case, the UE may deprioritize the first packet and/or the second packet. That is, the UE may deprioritize the first packet and/or the second packet when the PPPR level of the first packet and/or the second packet is higher than the threshold for the PPPR level.

The processor 710 is configured to control the transceiver 730 to transmit at least one of the first packet and/or the second packet. The first packet and the second packet may be transmitted to different nodes. That is, the first packet may be transmitted to the network, and the second packet may be transmitted to another UE. Or, the first packet may be transmitted to another UE, and the second packet may be transmitted to the network.

The memory 720 is operatively coupled with the processor 710 and stores a variety of information to operate the processor 710. The transceiver 730 is operatively coupled with the processor 710, and transmits and/or receives a radio signal.

The processor 710 may include application-specific integrated circuit (ASIC), other chipset, logic circuit and/or data processing device. The memory 720 may include read-only memory (ROM), random access memory (RAM), flash memory, memory card, storage medium and/or other storage device. The transceiver 730 may include baseband circuitry to process radio frequency signals. When the embodiments are implemented in software, the techniques described herein can be implemented with modules (e.g., procedures, functions, and so on) that perform the functions described herein. The modules can be stored in the memory 720 and executed by the processor 710. The memory 720 can be implemented within the processor 710 or external to the processor 710 in which case those can be communicatively coupled to the processor 710 via various means as is known in the art.

According to embodiment of the present invention shown in FIG. 7, the processor 610 can determined a priority of the packet based on reliability level (e.g. PPPR) and/or congestion level (e.g. CBR). Therefore, when the reliability level of the packet is below than a specific level and/or congestion level of a carrier and/or a cell on which the packet is to be transmitted is higher than a certain level, the packet transmission can be deprioritized. Therefore, the processor 710 can control the transceiver 730 to transmit the packet based on the priority determined based on reliability level (e.g. PPPR) and/or congestion level (e.g. CBR).

FIG. 8 shows a BS to implement an embodiment of the present invention. The present invention described above for BS side may be applied to this embodiment.

A BS 800 includes a processor 810, a memory 820 and a transceiver 830. The processor 810 may be configured to implement proposed functions, procedures and/or methods described in this description. Layers of the radio interface protocol may be implemented in the processor 810. Specifically, the processor 810 controls the transceiver 830 to transmit information on a reliability level and/or a congestion level to the UE. The reliability level may be PPPR level, and the information on the reliability level may be a threshold for the PPPR level. The congestion level may be a level, and the information on the congestion level may be a threshold for the CBR level.

The memory 820 is operatively coupled with the processor 810 and stores a variety of information to operate the processor 810. The transceiver 830 is operatively coupled with the processor 810, and transmits and/or receives a radio signal.

The processor 810 may include ASIC, other chipset, logic circuit and/or data processing device. The memory 820 may include ROM, RAM, flash memory, memory card, storage medium and/or other storage device. The transceiver 830 may include baseband circuitry to process radio frequency signals. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving, from a network, a configuration for packet duplication, wherein the configuration includes (i) information informing that packet duplication is allowed for sidelink transmission, (ii) information regarding a first set of priority values for allowing packet duplication in the sidelink transmission, (iii) information informing that packet duplication is allowed for uplink transmission, and (iv) information regarding a second set of priority values for allowing packet duplication on the uplink transmission;
   generating a first packet having a first priority value and a second packet having a second priority value, wherein the first packet is to be transmitted via one of uplink transmission or sidelink transmission, and the second packet is to be transmitted via the other one of uplink transmission or sidelink transmission;
   based on that the first priority value of the first packet is included in the first set of priority values and/or the second set of priority values, duplicating the first packet one or more times;
   based on that the second priority value of the second packet is not included in the first set of priority values and/or the second set of priority values, skipping the packet duplication for the second packet; and
   based on a duplicated packet of the first packet colliding with the second packet at a same time:
   (i) prioritizing the second packet over the duplicated packet of the first packet, regardless of the first priority value of the first packet and the second priority value of the second priority value; and
   (ii) transmitting the second packet.

2. The method of claim 1, wherein the first packet and the second packet are transmitted to different nodes.

3. The method of claim 2, wherein the first packet is transmitted to the network via uplink transmission, and wherein the second packet is transmitted to another UE via sidelink transmission.

4. The method of claim 2, wherein the first packet is transmitted to another UE via sidelink transmission, and wherein the second packet is transmitted to the network via uplink transmission.

5. A user equipment (UE) configured to operate in a wireless communication system, the UE comprising:
   a transceiver;
   a processor; and
   a computer-readable memory operably coupled to the processor and storing instructions that, based on being executed by the processor, control the UE to perform operations comprising:
   receiving, through the transceiver from a network, a configuration for packet duplication, wherein the configuration includes (i) information informing that packet duplication is allowed for sidelink transmission, (ii) information regarding a first set of priority values for allowing packet duplication in the sidelink transmission, (iii) information informing that packet duplication is allowed for uplink transmission, and (iv) information regarding a second set of priority values for allowing packet duplication on the uplink transmission, generating a first packet having a first priority value and a second packet having a second priority value, wherein the first packet is to be transmitted via one of uplink transmission or sidelink transmission, and the second packet is to be transmitted via the other one of uplink transmission or sidelink transmission, based on that the first priority value of the first packet is included in the first set of priority values and/or the second set of priority values, duplicating the first packet one or more times;

based on that the second priority value of the second packet is not included in the first set of priority values and/or the second set of priority values, skipping the packet duplication for the second packet; and based on a duplicated packet of the first packet colliding with the second packet at a same time:
  (i) prioritizing the second packet over the duplicated packet of the first packet, regardless of the first priority value of the first packet and the second priority value of the second priority value; and
  (ii) transmitting, through the transceiver, the second packet.

6. The method of claim 1, wherein the UE is in communication with at least one of a mobile device, a network, and/or autonomous vehicles other than the UE.

* * * * *